US012135670B2

United States Patent
Berlit et al.

(10) Patent No.: US 12,135,670 B2
(45) Date of Patent: Nov. 5, 2024

(54) ADVANCED BUS PROTOCOL FOR DYNAMIC LIGHTING

(71) Applicant: Melexis Technologies NV, Tessenderlo (BE)

(72) Inventors: Kevin Berlit, Erfurt (DE); Jorgen Sturm, Erfurt (DE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 0 days.

(21) Appl. No.: 18/315,032

(22) Filed: May 10, 2023

(65) Prior Publication Data

US 2023/0367733 A1  Nov. 16, 2023

(30) Foreign Application Priority Data

May 16, 2022  (EP) .................................... 22173422

(51) Int. Cl.
*G06F 13/42*  (2006.01)
(52) U.S. Cl.
CPC .......... *G06F 13/42* (2013.01); *G06F 2213/40* (2013.01)
(58) Field of Classification Search
CPC ............... G06F 13/42; G06F 13/40247; G06F 13/4252; G06F 13/426; G06F 13/4269; G06F 2213/40; G06F 2213/4002; G06F 2213/4004; H05B 45/10; H05B 45/20; H05B 45/14; H05B 45/30; H05B 45/305; H05B 45/325
See application file for complete search history.

(56) References Cited

U.S. PATENT DOCUMENTS

| 5,579,496 A * | 11/1996 | Van Steenbrugge | .. H05B 47/18 345/169 |
| 2004/0158333 A1* | 8/2004 | Ha | .......... H04B 3/542 709/208 |
| 2005/0093488 A1* | 5/2005 | Hung | ..................... H05B 47/18 315/307 |

(Continued)

FOREIGN PATENT DOCUMENTS

| DE | 102015222504 A1 | 5/2017 |
| EP | 0507381 A2 | 10/1992 |
| EP | 3478031 A1 | 5/2019 |

OTHER PUBLICATIONS

Extended European Search Report for Corresponding European Patent Application No. EP22173422.1, Oct. 10, 2022.

*Primary Examiner* — Raymond N Phan
(74) *Attorney, Agent, or Firm* — Workman Nydegger

(57) ABSTRACT

A method of operating a plurality of driving units for powering electronic units is described. The method includes interchanging a data frame including a bit sequence, between a master control unit and at least one of a plurality of driving units at slave nodes. The method includes applying an ID field for addressing at least one driving unit, and applying a data field comprising information and/or instructions regarding the status of the electronic units. Applying the ID field comprises indicating the driving unit address using a first bit sub-string comprising N bits, allowing the master control unit to identify whether data should be received or transmitted, performing a data length decoding step, and adding a further bit string to the data field including information for carrying out an action by the driving unit.

15 Claims, 5 Drawing Sheets

(56) References Cited

U.S. PATENT DOCUMENTS

| | | | |
|---|---|---|---|
| 2012/0274236 A1* | 11/2012 | Lee | H05B 47/19 |
| | | | 315/297 |
| 2019/0132929 A1 | 5/2019 | Sturm et al. | |
| 2024/0045692 A1* | 2/2024 | Teng | G06F 9/3814 |

* cited by examiner

FIG 5

| ID | slave address | R/T | F | I | PL Length | p1 | p0 | Data field | | | | | | |
|---|---|---|---|---|---|---|---|---|---|---|---|---|---|---|
| | | | | | | | | instr | payload | | | | | |
| 5M1 | 0x04 | 0 | 1 | 1 | 1 | x | x | 0x0003 | 0x1000 | 0x1000 | 0x1000 | 0x1000 | 0x1000 | 0x1000 |
| 5M2 | 0x04 | 0 | 1 | 0 | 1 | x | x | not sent/received | 0x1000 | 0x1000 | 0x1000 | 0x1000 | 0x1000 | 0x1000 |
| 5M3 | 0x04 | 0 | 1 | 1 | 0 | x | x | 0x0002 | 0x1000 | 0x1000 | 0x1000 | | | |

FIG 6

| ID | slave address | R/T | F | I | PL Length | p1 | p0 | Data field | | | | | | |
|---|---|---|---|---|---|---|---|---|---|---|---|---|---|---|
| | | | | | | | | instr | payload | | | | | |
| 6M1 | 0x04 | 0 | 1 | 1 | 0 | x | x | 0x0302 | 0x1000 | 0x1000 | | | | |
| 6M2 | 0x04 | 1 | 0 | 1 | 5 | x | x | 0x0003 | *VfLed1 | VfLed1g | VfLed1b | *VfLed2 | VfLed2g | fLed2b |
| 6M3 | 0x04 | 1 | 0 | 0 | 5 | x | x | not sent/received | *VfLed1 | VfLed1g | VfLed1b | *VfLed2 | VfLed2g | fLed2b |

FIG 7

| ID | slave address | R/T | F | I | PL Length | p1 | p0 | Data field instr | payload | | | |
|---|---|---|---|---|---|---|---|---|---|---|---|---|
| 7M1 | 0x04 | 0 | 0 | 0 | 0 | 0x | x | "burst pointer address" | 0x1234 | | | |
| 7M2 | 0x04 | 1 | 0 | 0 | 4 | 4x | x | not sent/received | *0x1234 | *0x1235 | *0x1236 | *0x1237 |
| 7M3 | 0x04 | 1 | 0 | 1 | 4 | 4x | x | 0x1234 | *0x1234 | *0x1235 | *0x1236 | *0x1237 |

*payload last column:* 7M2: *0x1238 ; 7M3: *0x1238

FIG 8

| ID | slave address | R/T | F | I | PL Length | p1 | p0 | Data field instr | payload | | | | | | | |
|---|---|---|---|---|---|---|---|---|---|---|---|---|---|---|---|---|
| 8M1 | 0x04 | 0 | 0 | 1 | 7 | 7x | x | 0x1234 | *0x1234 | *0x1235 | *0x1236 | *0x1237 | *0x1238 | *0x1239 | *0x1240 | *0x1241 |
| 8M2 | 0x04 | 0 | 0 | 1 | 7 | 7x | x | 0x1242 | *0x1242 | *0x1243 | *0x1244 | *0x1245 | *0x1246 | *0x1247 | *0x1248 | *0x1249 |
| 8M3 | 0x04 | 0 | 0 | 1 | 7 | 7x | x | 0x1250 | *0x1250 | *0x1251 | *0x1252 | *0x1253 | *0x1254 | *0x1255 | *0x1256 | *0x1257 |
| 8M4 | 0x04 | 0 | 0 | 1 | 6 | 6x | x | 0x1258 | *0x1258 | *0x1259 | *0x1260 | *0x1261 | *0x1262 | *0x1263 | *0x1264 | |

ADVANCED BUS PROTOCOL FOR DYNAMIC LIGHTING

FIELD OF THE INVENTION

The invention relates to the field of data transmission and electronic communications via bus protocols. More specifically it relates to the field of illumination and signalization systems.

BACKGROUND OF THE INVENTION

In consumer goods, such as for example automobiles, control of electronic components is done using bus protocols, which establish communication between a master control unit and driving units, which control one or more electronic units.

In bus protocols, data load on the bus should be kept as low as possible, in order to maintain a limited bandwidth. This also reduces electromagnetic compatibility issues, since emissions are kept low.

For the particular example of automotive applications, control of illumination systems should be robust and failproof. For example, it should not be affected by external fields, electric peaks or other sources of noise. However, automotive environments are electrically noisy. A faulty transmission of data, or unintended activation of illumination systems, can result in dangerous situations which should be avoided.

In order to reduce these effects, document DE102015222504A1 discloses an implementation based on SPI or on unidirectional differential data bus, which reduces the influence of antenna effects due to for example influence of the power line or external influences. This protection is only partial, and it does not allow protection due to variations or irregularities in the LED controllers.

Additionally, the need of reduction of data load clashes with the tendency of using increasingly larger number of driving units to be controlled (e.g., larger number of illumination units, in lighting architecture). The higher the number of driving units to be controlled, the larger the number of addresses is required.

Registers are usually arranged in 8 bits, 16 bits or 32 bits width, a communication frame usually includes an identification field (ID field) in conformance with registers, e.g., 16 bits. Since additional information (e.g., commands) is required for addressing, usually less than half of these 16 bits are available for the driving unit address. This available address space is usually not enough to address all the required driving units, usually less than 100, for example around 60. It may be possible to increase the ID field, but this would require change registers and processors. Since a width of 16 bits is in line to microcontroller or CPU architectures that are doing the further signal processing, and different components (drivers, etc.) are provided by different suppliers, using an ID with of 16 bits for a bus protocol between the members of a network is desirable, to keep compatibility between these different components.

It would be desirable to maintain the additional functionality and options of the bus protocol, while at the same time allowing addressing a large number of driving units, e.g., a number larger than 100 driving units.

SUMMARY OF THE INVENTION

It is an object of embodiments of the present invention to provide a method of communication between master and slave, comprising interchange of a communication frame including an ID field and a DATA field, which allows addressing a large number of driving units, with a flexible protocol that allows interchange of commands and information.

The present invention provides a method of operating a plurality of driving units for powering electronic units. The method comprises interchanging a frame including a bit sequence between a master control unit and at least one of a plurality of driving units, the sequence being divided in fields of consecutive bit strings, further comprising:
  applying an ID field for addressing at least one driving unit, for interchanging data between the master control unit and the at least one addressed driving unit, and
  applying a DATA field comprising a payload including information and/or instructions regarding the status of the electronic units of said addressed at least one driving unit.

Applying the ID field further comprises indicating the driving unit address using a first substring of bits comprising N bits, where $2^N$ is equal or higher than the number of driving units in the plurality of driving units, for applying the DATA field on the addressed driving unit, and ignoring the DATA field if the driving unit is not addressed.

Applying the ID field further comprises using a receive/transmit command bit for assigning values, for allowing the master control unit to identify whether data should be received from or transmitted to driving units, also for allowing each addressed driving unit to decode which action is required by the master control unit when the frame is received by the addressed driving unit, depending on the value assigned to the receive/transmit command bit. In other words, for a first value of the receive/transmit command bit, the master control unit can specify that a data should be received by the driving units. For a second value, the master control unit can specify that the driving units should transmit data as a response to the request of the master control unit.

Applying the ID field further comprises indicating the length of the payload using a second substring (ID4-ID2) in the ID field.

The present invention provides using an instruction bit I for assigning values, indicating the type of information in the DATA field.

Applying the DATA field comprises applying a sequence of bits consisting of the sequence of bits of the payload, if the instruction bit has a first value. If the instruction bit has a second value different from the first, applying the DATA field comprises applying a sequence of bits comprising the sequence of bits of the payload, and at least one additional bit substring at a pre-defined position in the DATA field, the additional bit substring introducing information of a driving unit action.

It is an advantage of embodiments of the present invention that a limited number of bits can be used for addressing a driving unit while at the same time allowing expanding the ID field with additional bits, e.g., words, in the DATA field, for including driving unit instructions (instructions or actions to be executed by the driving unit, or instructions executed by the driving unit, depending on whether the message is to the slave or from the slave), assignments or the like. It is an additional advantage that the length of the payload can be indicated, enabling a flexible protocol.

In some embodiments of the present invention, applying the ID field further comprises applying a function bit for assigning values, and further comprises assigning bits of the DATA field to different electronic units for a first value of the function bit, and processing data bits in the DATA field as driving unit instructions for a second value of the function bit.

It is an advantage of embodiments of the present invention that the frame can be used to include instructions or assigning data bits to electronic units connected to the driving unit, for updating only electronic units that need to be updated. It is an advantage of embodiments of the present invention that the master may send data bits to only the connected electronic units that need updating, thus reducing the bus load thereby.

In some embodiments of the present invention, applying the ID field comprises using a string of 16 bits. It is an advantage of embodiments of the present invention that a typical register arranged in 16 bits can be used, also allowing using standard microcontrollers and well-known CPU architectures.

In some embodiments of the present invention, indicating the driving unit address using a first substring of bits comprises using a first bit substring consisting of 8 bits. It is an advantage of embodiments of the present invention that there are up to 264 addresses available. Thus, a high number of driving units (e.g., 260) can be addressed individually.

In some embodiments of the present invention, applying the ID field may comprise using the second substring (ID4-ID2) consisting of 3 bits. This allows sufficient digits to encode different values of the data length for many different applications, without taking many bits in the ID field.

In some embodiments of the present invention, powering electronic units comprises powering LED clusters including more than one LED. It is an advantage that several LEDs can be controlled with one driving unit.

In some embodiments of the present invention, interchanging a frame comprises assigning the second value to the instruction bit I such that at least one additional bit substring is added to the DATA field, and further comprises transmitting a DATA field from the at least one driving unit to the master control unit, wherein the additional bit string includes information of the instruction performed by the driving unit.

It is an advantage of embodiments of the present invention that the DATA field can be used to inform a master about the instruction performed by a slave e.g., as a response to a previous request from the master control unit.

In some embodiments of the present invention, applying a DATA field further comprises transmitting an instruction in at least one word added to the DATA field, divided in a predefined first byte containing the position of at least one electronic unit, and a predefined second byte, different from the first byte, containing an identifier used to select which data from the driving unit to the master control unit shall be loaded in a transmit buffer to be transmitted by the addressed driving unit in a next frame.

It is an advantage of embodiments of the present invention that the MCU may send data bits to only the connected electronic units that need updating, rather than to every connected electronic unit, reducing the bus load thereby. It is a further advantage that in the same second bit substring, the MCU can send additional instructions to the driving units.

In some embodiments, the MCU may send, to the previously addressed slave, a request to send the data in the transmit buffer of the driving unit to the MCU.

In some embodiments, sending the request from the MCU comprises setting the second value of the instruction bit I for applying the additional bit string, to send the data in the transmit buffer from the driving unit to the MCU and further sending, in the additional bit string, the identifier previously received by the driving unit. It is an advantage of embodiments of the present invention that the driving unit can send a confirmation of the previous request made by the MCU.

In some embodiments of the present invention, using an instruction bit comprises assigning the second value to the instruction bit such that at least one additional bit substring is added to the DATA field, wherein the at least one additional bit substring includes a burst pointer address.

In particular embodiments, the method further comprises reading the information of registers using the burst pointer address for a first value of the receive/transmit command bit, or writing the information in the registers using the burst pointer address for a second value of the receive/transmit command bit.

In a further aspect, the present invention provides a driving unit connectable to a plurality of electronic units and to a master control unit, the driving unit being configured to perform the steps of the method of the present invention.

The present invention provides a system comprising a plurality of driving units in accordance with the previous aspect, further comprising a master control unit connected to the plurality of driving units, the master control unit being configured to perform the steps of the method of the present invention.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 5 illustrates a communication frame in accordance with embodiments of the present invention showing the effect of using the instruction bit I, and where a function bit F is used to assign data bits to control electronic units ('LED-data') from the payload to specific electronic units.

FIG. 6 illustrates a communication frame in accordance with embodiments of the present invention with an information request from the master to an addressed slave, in particular 6M1 shows both information request and LED-data bits for assigning electronic units.

FIG. 7 illustrates the use of a burst pointer address in accordance with embodiments of the present invention for reading registers.

FIG. 8 illustrates a communication frame in accordance with embodiments of the present invention for writing registers.

Figure 1:
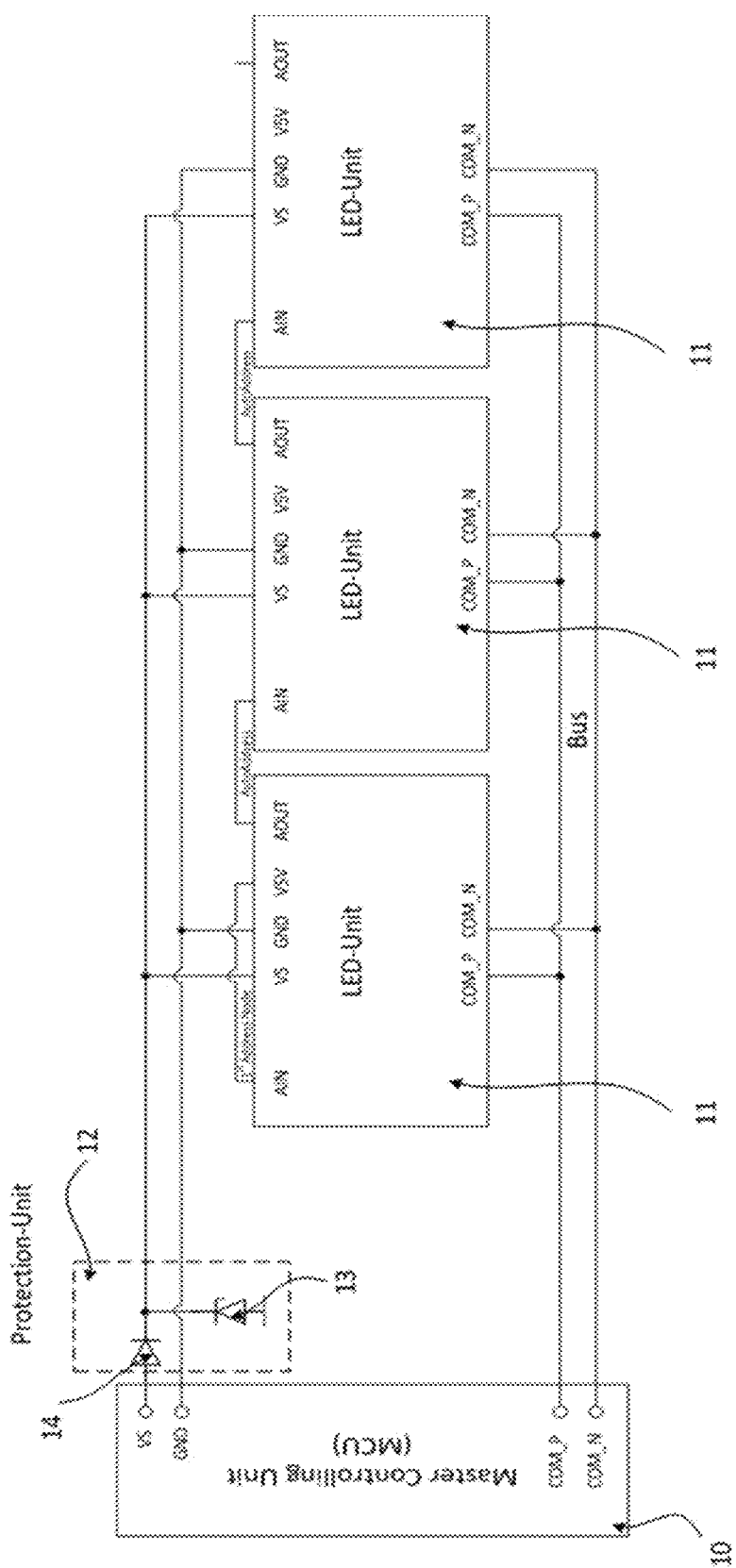
FIG. 1 illustrates a dynamic light system for interchanging data between a plurality of LED driving units and a master control unit, according to embodiments of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. The term "comprising" therefore covers the situation where only the stated features are present and the situation where these features and one or more other features are present. Thus, the scope of the expression "a device comprising means A and B" should not be interpreted as being limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention relates to an enhancement of the communication methods and devices disclosed in patent EP3478031B1. The present invention, thus, relates to an optimization of the communication between a master and slaves. The slaves include electronic units which may be controlled by the slave in accordance with instructions by the master, or master control unit (MCU).

In the description, the terms "slave", "driver", and "driving unit" are used interchangeably in the following discussion. Where in embodiments of the present invention reference is made to "driving units", reference is made to units including a controller or the like to provide control of a plurality of electronic units. The driving units are connected to the MCU via the bus. A driving unit can control its connected electronic units in accordance with the instructions received by the MCU. In some embodiments the driving unit may comprise one or more electronic units such as LED or LEDs. These LEDs may form clusters (LED clusters). The present invention is not limited to LEDs and it can be applied to other types of lighting devices, even to other types of electronic units.

Where in embodiments of the present invention reference is made to LED, reference is made to a single light emitting diode. The diode emits one single colour, and its brightness is the only parameter that is usually adjusted by adjusting the modulation. In pulse width modulation (PWM), a LED requires information encoded in 16 bits, thus 2 bytes. On the other hand, where reference is made to a LED cluster (in particular RGB unit), reference is made to a group of LEDs (in particular to a cluster of a red LED, green LED and blue LED), that might preferably be in one package. The package may include e.g., 4 terminals corresponding to a supply terminal and a terminal for each LED of the cluster (for red, green and blue LEDs). This light from the cluster can be adjusted in brightness and colour. Since 2 bytes (equivalent to 1 word) are required for a single LED, an RGB unit can be updated and controlled with 6 bytes. However, electronic units may form different clusters grouped by different parameters.

Where in embodiments of the present invention reference is made to "word", reference is made to a predetermined number of bits which are processable as a single unit by a processor. In embodiments of the present invention, a word consists of two contiguous bytes. A word thus contains 16 bits, which is required for PWM control of a single LED, see above. This means that control of a single LED can be done in embodiments of the present invention with one word, so an RGB unit can be controlled with 3 words. The bits of a word are numbered from 0 through 15; bit 0 is the least significant bit (LSB). The byte containing the LSB of the word is defined as the low byte; the byte containing bit 15 is the high byte. Although the examples in the following refer to 2-byte words, the present invention is not limited thereto, and the present invention may be applicable to different processor architectures which may accept words of different sizes.

The invention provides a communication protocol between a master (MCU) and at least one slave (driving unit) of a plurality thereof. The communication is based on a sequence of bits which allows low load on the bus, while simultaneously allowing a large number of drivers to be addressed. The sequence of bits is divided in at least an ID field and a DATA field, which includes the data payload. The header, including the ID field, is sent by the MCU. The following bits forming the DATA field are sent by the MCU in master-to-slave messages, and by the addressed driving unit or driving units in slave-to-master messages. The information whether the message is master-to-slave or slave-to-master can be included in the ID field, specifically in the receive/transmit command bit, as explained below. Other fields are usually included in a valid frame, such as a BREAK field and a CRC. The invention provides, in particular, an instruction bit I which allows adding a sequence of bits (e.g., command space) for adding instructions to driving units. Since the bits available in the ID field are reduced due to the longer string available for the address of the driving unit, an additional field can be added to include actions to be performed by the driving units. For example, the additional space can be used in a master to slave (M2S) communication to send instructions to be performed at driving units, or it may be used by a driving unit to inform the master of the actions performed by driving units, when the communication is from slave to master (S2M). Additionally or alternatively, the additional bit string can be used to assign data bits to electronic units, as explained further below.

The instruction bit I is part of the bits in the ID field. The additional sequence of bits can be added to the DATA field. The sequence of bits may comprise at least one word, for example one word or two words, the present invention not being limited thereto.

The enhancement of the 16-bit ID field allows to reduce data load by sending less data. The implementation on a system allows a more secure system. The instruction bit I enables the addition of the bit string (e.g., at least one word) so the length of the DATA field is increased by the added bit string.

In some embodiments of the present invention, the at least one word is located at the beginning of the DATA field.

In some embodiments, the added bit string (at least one word) is an instruction to be performed by one or more driving units (or slaves).

The added bit string could be sent by the slave as well if the MCU requests a S2M frame. In some embodiments, the additional bit string may contain information from the slave to the MCU regarding the instruction that has been performed by the slave.

The added bit string could be used for a LED-frame, which allows assigning electronic units, and for instructions in data-containing communication frames; the added bit string may even include both information for assigning electronic units and additionally information regarding instructions.

The length of the DATA field is defined on the PL length field, in a substring (ID4-ID2) of the ID field, which defines length of the payload, and also by the presence of an additional bit string depending on the instruction bit. The function bit F if present may determine how the data of the payload is measured. The present invention provides a high flexibility for sending and requesting instructions and assigning bits to specific electronic units, which results in a reduction of the load in the communication bus.

The instruction bit can only be set or reset by the MCU controlling the bus, since the ID field, which includes the instruction bit I, is sent by the MCU.

In the following, the present invention will be explained with reference to concrete applications as a system and elements thereof, and as a method of communication.

In a first aspect, the present invention relates to a system including a master control unit (MCU), one or more slaves which may be driving units for driving at least one electronic unit, and comprising a communication bus for establishing interchange of data sequences between the MCU and each of the plurality of driving units. Each driving unit may be connected to the same communication bus.

In some embodiments, the system is a lighting system, for example for vehicles or automotive, but embodiments of the present invention are not limited thereto. The system advantageously provides an increased safety by accurate driving of the electronic units.

FIG. 1 shows a lighting system in accordance with embodiments of the first aspect of the present invention. The MCU 10 and driving units 11, or slaves, are connected to a bidirectional bus for exchanging data. In this master—slave system, data can only be provided from the master to one or more slaves and from a slave to a master. It cannot be provided from one slave to another slave.

The driving units may be LED driving units. On the supply of the driving units, one or more protection units 12 might be connected, to protect against surges, or against reverse polarity, etc. In some embodiments, the protection unit or units might comprise a voltage protection element 13, a reverse polarity protection element 14, a combination thereof, etc. These protection units might suppress high voltage or ESD disturbances on the supply line and avoid damages on the system in case a reverse polarity of the supply lines VS and GND is applied. The protection unit or units may be connected between the supply and at least one LED driving unit, or some of the units from the plurality. For example, it may be connected between the supply and all the LED driving units, as shown in FIG. 1.

Light information (e.g., light intensity, light colour or PWM ratios related thereto) may be transported from the MCU 10 to the LED driving units 11 via the bus. The present invention is not limited to light information, and diagnostics information may be interchanged also between the driving units and the MCU, also via the bus. Diagnostics information may include information whether all LEDs carry e.g., a given current or not.

The system is adapted to have a flexible configurable auto-addressing system for assigning different addresses to the driving units. In some embodiments, the system typically may comprise several registers for providing checkpoints at one or more stages of data interchange, for example at the level of addressing, at the level of powering or information transmission to and from the MCU, or even at the level of starting or finishing data interchange. Typically, the checkpoints are based on comparing the length of a particular string of bits with the expected length of the string at a particular stage of the data transmission. For example, if the communication bus suddenly drops the voltage, but this happens for less than 12 bits of length, the system may disregard this event as noise. If this happens for 12 bits of length, the driving units may start reading the data sequence. This can be applied to several stages of the data transmission, including the end of transmission. This provides very robust shielding against electromagnetic interference, surges, electrostatic discharge and other undesirable phenomena that takes place in automobile environments, resulting in very stable and robust driving of electronic units (e.g., LEDs).

Figure 2:
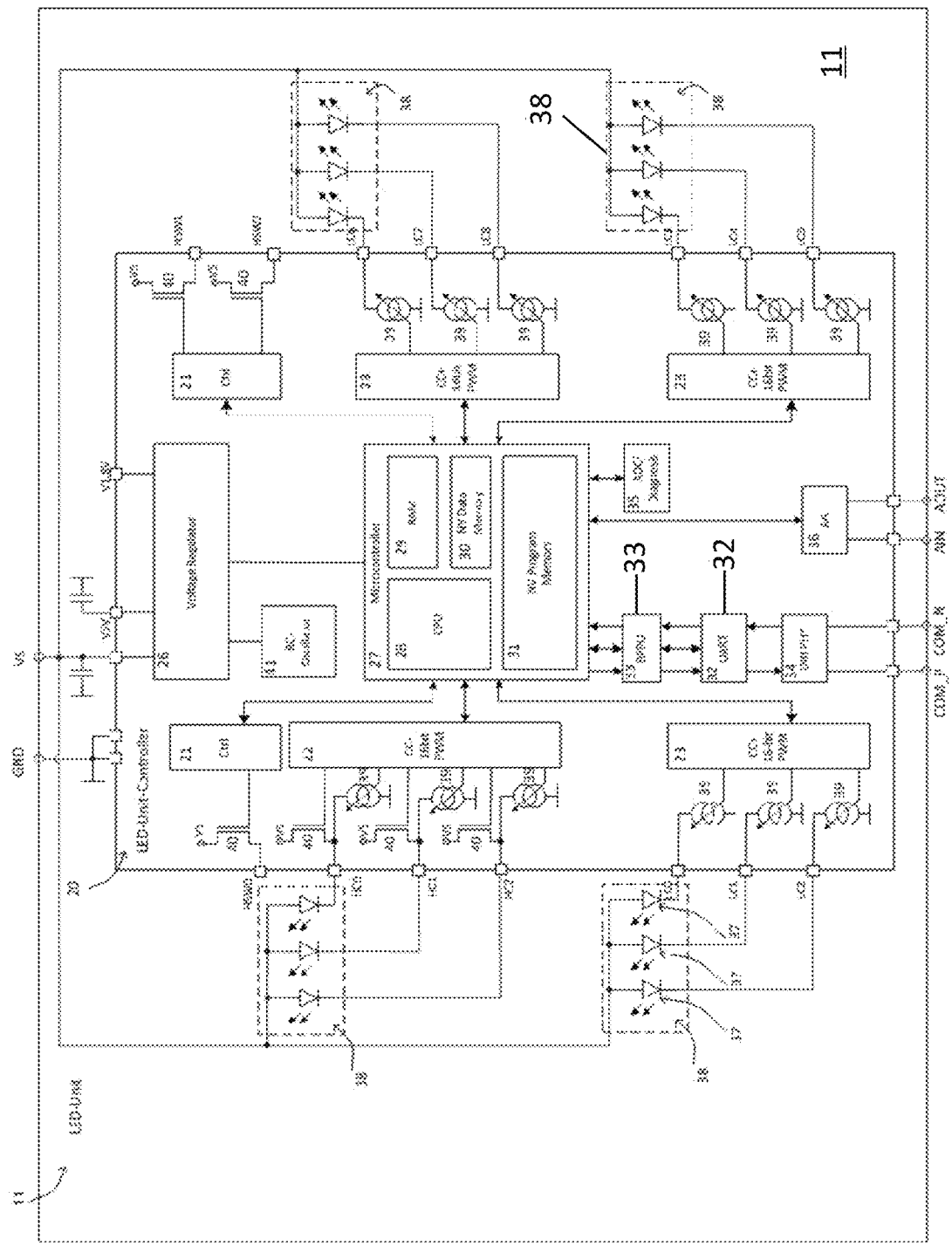
FIG. 2 illustrates a possible LED driving units in accordance with embodiments of the present invention.

The driving unit may comprise a controller for controlling one or more electronic units, which may be organized as clusters (e.g., LED clusters, including several LEDs, e.g., different LEDs, for example an RGB unit). The driving unit comprises means for processing communications received via the bus. In some embodiments, the data interchanged through the communication bus is processed through software, for example in a CPU of the driving unit. In some embodiments, the controller comprises at least one bus protocol processing unit (BPPU) for processing data interchanged through the communication bus, at least one control unit for controlling the powering of the electronic units of the clusters according to any data sequence sent by the MCU. The BPPU, in one embodiment, can also be handled as a software function performed by the CPU of the driving unit. The driving unit (e.g., its software or e.g., the at least one BPPU) is in particular adapted for processing an ID field for addressing at least one driving unit, for interchanging data between the master control unit and the at least one addressed driving unit, and a DATA field comprising information and/or instructions regarding the status of the electronic units FIG. 2 shows a LED driving unit 11 suitable for an illumination system of the present invention. The driving unit 11 may comprise a cluster 38 including LEDs. Such unit has been discussed previously in document EP3478031B1 with reference to FIG. 2A and FIG. 2B, in particular paragraph [0074] to [0093]. The same unit can be used in embodiments of the present invention, however, the MCU and the driving unit of embodiments of the present invention are configured to carry out the method of the present invention. They may be adapted for processing or transmitting (or both) the communication frame including the ID field with the instruction bit I and the possibility of adding a bit string to the data field of the communication field as a response to a predetermined value of the instruction bit I, in accordance with embodiments of the present invention. In the particular embodiment of FIG. 2, the LED driving unit 11 comprises a bus protocol processing unit (BPPU) 33 which performs the processing of the data to be received/transmitted, applies functional safety measures, and/or triggers error handling if needed. The BPPU 33 may also generate interrupts and control signals and send them to the CPU and to the universal asynchronous receiver-transmitter 32 (UART). The overall implementation reduces the need of resources of the CPU. The BPPU 33 may comprise e.g., a digital state machine, or any other type of unit for processing the bus protocol for dynamic light applications. The BPPU 33 may be configured to carry out the communication in accordance with steps of the present invention, including processing and/or applying the sequence of bits on the bus.

In embodiments of the present invention, a differential bus (e.g., comprising two wires) can be used, rather than a single wire bus. Such differential two wire bus, because the differential nature of the signals is more robust to disturbances, allows a higher data rate compared to a single wire bus as for instance a Local Interconnect Network (LIN) bus with only 20 kbit/s. These higher data rates of e.g., 0.5-4 Mbit/s are needed, for instance, in dynamic light applications. Thanks to the specific communication protocol of the present invention, up to 256 addresses can be used. This allows more than 200 slaves can be addressed, e.g., more than 250, for example 252 slaves, without reducing functionality. The bus can be bidirectional, allowing exchanging light information and diagnostics information.

As mentioned earlier, the system can be configured to have a flexible configurable auto-addressing system for assigning different addresses to the driving units, including several registers for providing checkpoints at one or more stages of data interchange, the checkpoints being based on comparing the length of a particular string of bits with the expected length of the string at a particular stage of the data transmission, which provides robust shield against EM interferences, surges and other undesirable phenomena, as explained before.

Node address can be set by autoconfiguration or auto-addressing, which provides the slaves with a unique network address. This is usually done when all driving units are connected to the bus and the system is powered up for first time. Autoconfiguration can be repeated at any time. Additionally, the system may include calibration means for calibration of each node through the network, for example the driving unit and connected electronic units, for a defined output. For example, a light output, such as colour and/or intensity, can be calibrated, and the calibration data is stored in the data memory (e.g., NV data memory) of the slave. This can be used when the slaves provide a requested light output, depending on the commands from the master. Calibration is usually done on module level in a defined test setup at a given supplier.

The present invention provides functional safety at system level, providing safety functions and diagnostics elements at the bus protocol, and/or at hardware level in the nodes (e.g., functional safety level B). The present invention can be robust against voltage drops over the supply lines. The present invention can advantageously present protection means and safety measures in automotive environments, e.g., against electrostatic discharge (ESD), etc., and improve electromagnetic compatibility.

In particular, the present invention can be used in dynamic light systems in automotive environment, e.g., for ambient light as well as signal information for the driver. The system may therefore comprise functional safety requirements. Embodiments of the present invention may comprise safety measures in the bus implementation hardware and protocol.

The present invention can provide a system with dedicated command language, dedicated hardware memory and register approach for light control. Additionally, open configuration means can be applied to the protocol and hardware.

In the system, the slaves are connected at slave nodes in the network system to the master, and the system is configured to implement a communication between master and slaves, e.g., M2S and S2M communications, in accordance with a second aspect of the present invention. The master and slaves may be configured to apply the method of communication in accordance with the second aspect of the present invention.

The second aspect of the present invention provides a method of operating driving units, for controlling electronic units connected to said driving units. The method comprises interchanging a bit sequence, between a master control unit (MCU) and at least one of a plurality of driving units at slave nodes, the sequence being divided in fields of consecutive bit strings. In particular, the method comprises applying an ID field for addressing at least one driving unit, for interchanging data between the master control unit and the at least one addressed driving unit. The method comprises subsequently applying a DATA field comprising information and/or instructions regarding the status of the electronic units. The receive/transmit command bit (R/T), further also referred as R bit, function bit F and instruction bit I of the ID field are always set by the MCU. In particular, the method comprises sending an ID field by the MCU through the bus. The slave receives data or transmits data depending on the value of the R bit. In some embodiments, the slave receives data when R is zero, so the communication is M2S. In M2S communication, the MCU sends the ID field and the DATA field. In turn, the slave transmits data when R is 1, so the communication frame is S2M. In S2M communication, the MCU sends the ID field and the addressed driving unit or units send the DATA field, following the parameters in the ID field.

Applying the ID field thereby comprises indicating the driving unit address, using a first bit substring comprising N bits, where 2^N is equal or higher than the number of driving units of the plurality, for applying the DATA field on the addressed driving unit, and for ignoring the DATA field if the driving unit is not addressed. Since the ID field includes a fixed number of bits, increasing the number of bits available for the addressing results in a reduction of space for other functions of the ID field.

The method includes the use of a bit in the ID field as an 'instruction bit' I, which enables an additional sequence of bits (or bit string) for functions usually applied in the ID field; however, the additional bit string is introduced in the DATA field.

The advantages of embodiments of the method using the instruction bit I will be apparent in the following comparison between frames, in FIG. 3 and FIG. 4, where both use the same length for the slave address but only the frame in FIG. 4 uses the instruction bit I.

Figure 3:
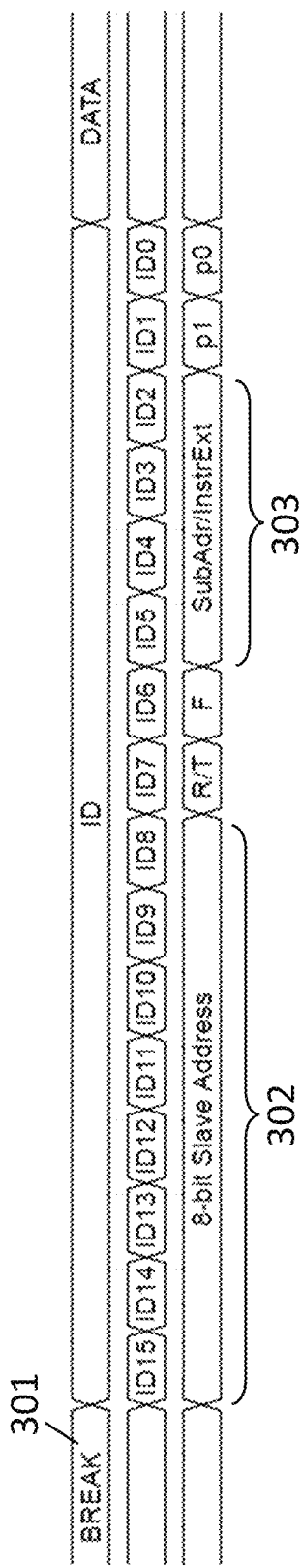
FIG. 3 illustrates a communication frame for communication between master and slaves, with an ID field of 16 bits, where half of them are used to address slaves.

FIG. 3 shows a frame following a bus protocol, including an ID field followed by a DATA field. The frame starts, after a BREAK field 301, with the ID field. The ID field includes or consists of 16 bits, numbered from 15 to 0 (ID15-ID0). The ID field includes a first substring 302 for the driving unit address.

The first substring comprises a string of 8 bits (an 8-bit address) which would allow to address 2^8=256 driving units, or less. For example, the system is configured to address up to e.g., 252 driving units, where e.g., 4 addresses are reserved by the system for broadcasting purposes, e.g., from the MCU to all the driving units.

Applying the ID field by the MCU further comprises using an R/T command bit (or R bit) for allowing the MCU to define whether data should be received or transmitted, or allowing each addressed driving unit to decode which action is required by the MCU when the bit sequence is sent to the driving units.

Applying the field further comprises applying a second substring 303 for sub-address/instructions. It also shows a function bit F as disclosed in document EP3478031B1, explained further below.

Applying the field further comprises applying a 2-bit parity information p0/p1 for the ID field, as known in the prior art. If the parity matches to the remaining bits of the ID field, the information has been transmitted correctly via the bus. If the parity does not match, the provided information should be discarded.

In particular, the function bit F can be used to specify the type of information included in the DATA field. This information is used to obtain the length value, related to the DATA field, in the second substring 303 (ID5-ID2) of the ID field. For a particular value of the function bit, data bits in the following DATA field are assigned to different electronic units (e.g., LEDs) connected to the addressed driving unit, using some bits in the second substring. A length decoding step can be performed also, and the length of data bits in the next field (DATA field) can be indicated using some bits in the second substring, different from the ones assigning units. If the function bit has the other value, only a length decoding step is performed, for indicating the length of the bit string in the DATA field. Thus, the length decoding step may always be performed, and for a predetermined value of the function bit F, data bits from the DATA field are assigned to electronic units, for example to update the output of these electronic units, e.g., LEDs. The value of the function bit F determines the format used to decode the length, in other words, the function bit F determines how the counting is done, depending on whether the data in the DATA field is used as instructions or as bits to be assigned to electronic units.

However, the available space for these options is limited by the number of bits in the second bit substring, which is in turn limited by the number of bits included in the first substring. In some cases, it may not be possible to address each electronic unit connected to the driving unit, because there is simply not enough space for addressing all electronic units or not enough space for higher number of instructions.

For example, in some cases, the received data in receive mode has a length defined by the number of bits in the SubAdr/InstrExt ID5, ID4, ID3, ID2 multiplied by 6 bytes or three words, corresponding to one word per LED in an RGB unit including three LEDs (one red, one green and one blue). This leaves room for a variable data length between 0 byte (no bit set: ID[5:2]=0000) and 24 bytes (all bits set: ID[5:2]=1111).

If ID[5:2] would be binary coded, then this space increases to (2^4)*6 Bytes=96 Bytes.

However, this solution presents some disadvantages, mainly related to the 4 bit limitation of the SubAdr/InstrExt (ID5-ID2): The InstrExt field is limited to 2 bit only, because the space available in the field to include instructions is shared with the space available for data length decoding within the ID[5:2] (F=0). This would allow the encoding of only 4 instructions, which is not enough.

The SubAdr field has a size limited to 4 bits so it could only be used to e.g., specify which LEDs are updated in small applications, for example applications with only 4 LEDs. Current applications usually include 6 LEDs per slave, as two RGB units per slave. In current applications, the MCU would need to send the data for all connected LEDs, even if only 1 LED must be updated, increasing the bus load significantly.

In order to overcome these disadvantages, the present invention provides that one of the bits in the ID field is used as an instruction bit I. In particular, one of the bits in the second bit substring can be used. This means that another bit in the ID field becomes less available for instructions or information. However, additional space become available in the DATA field. The additional space includes information of an action by the driving unit, for example the bit substring may include information that prompts the driving unit to carry out an action, or information regarding the action carried out by the driving unit as a request of the master (e.g., repetition of the instruction requested by the master, as means of confirmation).

The specifics of the information may depend on whether the message is M2S or S2M, diagnostics, update of registers, etc. For example, it may include an instruction or request of information by a master. It may include information for assigning data bits to electronic units (e.g., information for updating LEDs). It may include information sent by the slave as requested by the master. In general, the added bit string can be used to introduce information related to the payload, such as type of instruction, data bits assignment, etc. Data length decoding can always be performed, and the field of the PL length may always include the same number of bits (e.g., 3 bits, corresponding to the size of the former second bit substring minus the bit used as instruction bit I). By shifting the problem now to one additional word in the DATA field, it would be in theory possible to address more LEDs, e.g., 16 LEDs if one word is added. However, due to the limited space available in the ID field, the number of LEDs that is possible to address in a single communication frame is smaller, however large enough to address two RGB units.

In some embodiments of the present invention, a function bit F is also used as explained above, where for a value of the function bit F, the added word includes instructions or information of the driving units, and for a different value thereof, the added word assigns bits to specific electronic units, optionally also including instructions/information. In other words, for a first value of the function bit F, bits in the data field are assigned to electronic units, which also determines how the data length is calculated. If the function bit has the second value, the DATA field does not include bits for assigning to electronic units, but may include instructions sent to driving units in M2S communication, information such as diagnostics sent by the driving unit as a response of a request from the MCU in S2M communication, etc., which also determines how the data length is calculated. However, the first value of the function bit F does not block the communication frame from including instructions (e.g., information requests), together with bit assignments, as FIG. 6 will show.

Figure 4:
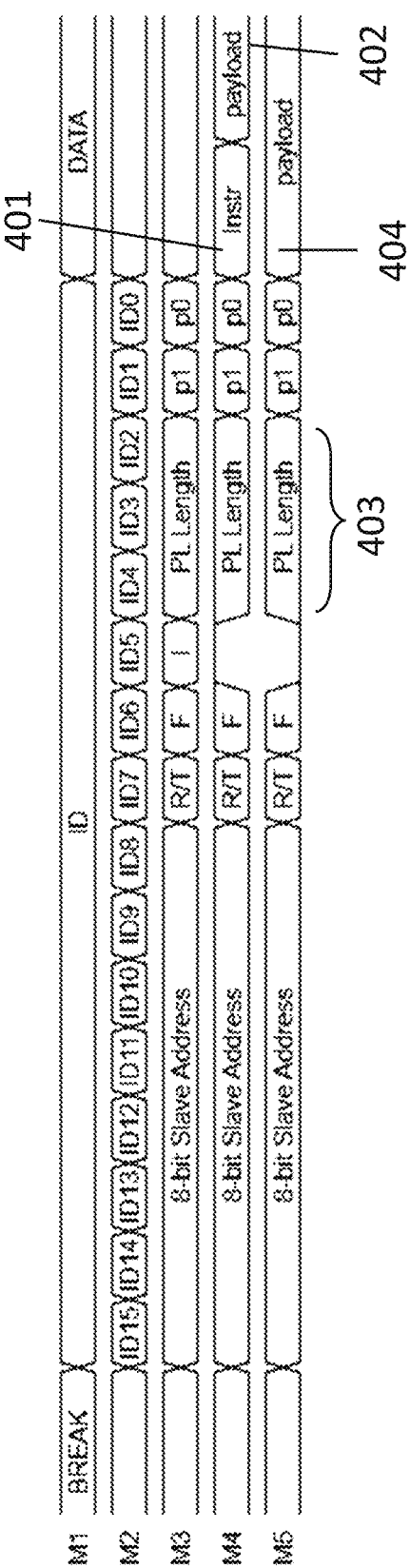
FIG. 4 illustrates a communication frame in accordance with the present invention, including an instruction bit I, where 8 bits are used to address slaves.

FIG. 4 shows a particular example of a bus protocol with a 16-bit ID field comprising an 8-bit first bit substring or 'Slave Address' ID15-ID8. As before, such substring would allow to address 2^8=256 driving units, or less, e.g., 252 driving units where 4 addresses are reserved by the system for broadcasting purposes. The different rows of the figure show the general frame, the bit assignment and different functions of the bits. The first row (M1) shows a frame of the protocol comprising a BREAK field, ID field and DATA field. The second row (M2) shows the bit assignments of the ID field and the third row (M3) shows the function of the different bits of the ID field, introducing the new instruction bit I.

The introduced instruction bit I further reduces the second bit substring 403 ID4-ID2 space to only 3 bits, due to length of the first bit substring and the presence of the receive/transmit command bit R/T, or R bit, function bit F and parity bits. The second bit substring 303 in FIG. 3 is indicated with the name SubAdr/InstrExt, including 4 bits ID5-ID2, while the second bit substring 403 in FIG. 4 includes 3 bits, ID4-ID2. With this reduction to only 3 bits, the second bit substring 403 is too short to encode instructions. However, it can still be used to include the length of the payload in the DATA field, so it is renamed as PayLoad Length, or PL length.

The fourth row M4 shows ID field where the instruction bit I is set to a first value (e.g., a value of 1), and the structure of the DATA field. A further predetermined number of bits, e.g., a further bit string, is added to the DATA field. In some embodiments, the added bit string 401 is at least one additional word, added at a predetermined position at the 'Instr' field within the DATA field, in the added 'instr' field. In some embodiments of the present invention, the further bit string is added at the beginning of the DATA field, before the payload. The information regarding the payload length is provided by the second bit substring 403, at the PL Length field. After this at least one additional word, the payload 402 follows. This at least one additional word 401 may be an instruction, e.g., an instruction from the MCU to the addressed at least one driving unit, or assignments of data to electronic units. For example, the additional word 401 may be information from an addressed driving unit to the master control unit in S2M communication, regarding e.g., which instruction has been performed by the addressed driving unit.

The fifth row (M5) shows the structure of the communication frame if the instruction bit I is set to 0. No additional words are introduced. The DATA field starts immediately with the payload 404. For example, the payload may form the complete DATA field.

The particular embodiment of FIG. 4, as mentioned earlier, includes a function bit F. Assigning data bits to different electronic units (LEDs), depending on the value of the function bit F, is done in the added bit string (e.g., word or words) in the DATA field, if the value of the instruction bit I enables the added bit string.

Since the value of the instruction bit may enable or disable the additional bit string in the DATA field, the length of the DATA field includes the payload and, possibly, the additional bit string, so it can be defined under the following conditions.

If I=0, the length of the DATA field is equal to the length of the payload defined by the PL Length, so the PL Length field includes a number with the length of the payload If I=1 the length of the DATA field is equal to the length of the payload defined by the PL Length increased by at least one additional word.

It should be noted that the payload always includes at least one data unit, so the actual length of the payload is equal to the length indicated in the PL length field plus one, i.e., PL length+1. It will be shown in the following examples that the PL length field always indicates one value lower than the number of data units in the payload itself. In the embodiments shown in the present invention, the present invention not being limited thereto, the field of the PL Length consists of 3 bits which, in decimal, allows values from 0 to 7, and since there is always a payload, the payload cannot be empty, so a value in the PL length field of 0 means that the payload has a data unit.

The function bit defines these 'data units', i.e., how the length of the payload is measured. For the payload the following definitions are valid.

If F=0, the payload is treated as Data, where the 'data unit' is one word. Then the number of words in the payload is calculated as (PL Length+1)*1 word. Since the PL length includes 3 bits, the values of (PL Length+1)*1 word range between 1 . . . 8 words=2 . . . 16 bytes payload.

If F=1, the payload is treated as assigned bits to LEDs, where depending on the particular electronic unit, a predetermined number of bits is required for each unit. In some embodiments of the present invention, the electronic units are RGB units and require 3 words to control them, as explained earlier, so the 'data unit' equals to 3 words. Then the number of bytes in payload is calculated as (PL Length+ 1)*3 words. Since the PL length includes 3 bits, the values of (PL Length+1)*3 word range between 3 . . . 24 words= 6 . . . 48 bytes payload.

Although in theory up to 16 RGB units could be addressed using all the bits of the additional word, the limit of 3 bits in the PL length imposes a practical top limit in the payload of 8 'data units', thus allowing a maximum payload of 24 words as shown above, or 48 bytes. With 2 bytes per single LED, the maximum number of LEDs that can be assigned is 24 single LEDs, or 8 RGB units.

The additional instruction bit I will provide several functionalities and advantages discussed in the following examples.

One of the main advantages is the possibility to address electronic units individually using the introduced bit string 401 as an "instruction field", e.g., in M2S communications. For example, the additional bit string 401 may be used to include assignments to electronic units, for example one or more 'sub-addresses' of respective electronic units connected to the addressed driving unit. In some embodiments, each bit of the additional bit string 401 could represent an electronic unit, e.g., a LED, and depending on the bits set, the payload is applied on the electronic units set by the bits of the additional bit string 401. For example, FIG. 5 shows three different cases of a communication frame, in three different rows 5M1, 5M2, 5M3 for the case of an MCU communicating with a particular driving unit in a system, where the driving unit connects to several electronic units, in this particular case for example several LEDs.

In particular, 5M1 shows the message content to update two RGB units labelled as LED1 and LED2 of a slave which has two RGB units connected. The instruction bit is set to 1, so an additional string of bits 501 is added, named as 'Instr' field. The 'Instr' field 501 is set to the value 0x0003, which in binary is 0b0011, thus data for LED1 and LED2 will be sent in the payload. The value 0b0011 automatically updates the RGB units LED1 and LED2.

PL Length=1, F=1 and I=1 indicates that there are 7 words in the DATA field, including 1 word of the instruction field plus (PL length+1)*3 words=6 words of payload since PL length is 1.

If there were no instruction field (I=0), the function bit F indicating assignment to electronic units, in this case LEDs, signifies that the LEDs are updated sequentially as the data in the payload is read. This means that the LEDs have an addressing sequence which may be used as 'sub-address'. As there is no dedicated instruction in the DATA field (I=0), the LEDs of the addressed driving unit will be updated with the provided payload. Since the payload is 6 words, the RGB units LED1 and LED2 are updated. This is shown in the row 5M2 which shows the same message as 5M1, but without the 'Instr' field, so the payload starts immediately after the ID field. In the present example, the two electronic units connected to the driving unit need to be updated. The results are the same as in 5M1, so the 'Instr' field is optional for this case.

The values of PL Length=1, F=1 and I=0 indicate a 6-word payload, corresponding to a DATA field length of 6 words.

However, if only the second RGB unit (LED2) would require an update, in the prior art (or if I=0), the payload still requires 6 words, where the information contained in the word intended for the first RGB unit (LED1) contains the same information as the previous communication addressing that unit LED1. Hence, the information of the unit LED1 needs to be included, but it contains the same information compared to the previous update. This is inefficient in terms of bus traffic and thus in terms of EMC.

Embodiments of the present invention allow addressing individual electronic units connected to the driving units regardless of the addressing sequence (their 'sub-address') without having to send a payload including information for the (non-addressed) electronic units lower in the addressing sequence (of lower sub-address), and with no need to perform additional steps.

For instance, 5M3 shows the message content where only the second RGB unit LED2 must be updated under use of the Instruction bit I=1 and therefore an additional word in the data field being added as an instruction ('Instr' field). In this case the instruction contains the value 0x0002, which in binary is 0b0010, so only LED2 is addressed.

The values of PL Length=0, F=1 and I=1 indicate 1 word instruction plus 3 words payload=4 words as the length of the DATA field.

If only LED2 needs to be updated, then compared to the prior art (or compared to 5M2, where I=0), the payload could be reduced by 3 words, the DATA field could be reduced by 2 words (since there is an added bit string with length of 1 word). The information in the payload will be used to update LED2 only, as indicated by the added bit string 501 of the 'Instr' field added before the payload. With this the bus traffic might be reduced, leading to a better EMC and allowing also more data throughput for a given bandwidth of the bus.

The present invention is not limited to two electronic units connected to the addressed driving unit. For example, in case the driving unit would have e.g., 3 LED clusters of 3 LEDs each, in order to address each LED, then the payload includes 9 words (considering that one word is used to control each LED). If, from these 3 clusters, less than 3 LED clusters need to be updated, then in prior art systems (or if I=0), three words are needed for each LED cluster to be updated, and an extra word for each LED cluster with a 'sub-address' lower than the first addressed LED cluster. The present invention allows assigning words in the payload to specific LEDs, thereby reducing data load.

As a particular example, in case of 3 RGB units (LED1, LED2, LED3) connected to the driving unit, if only the second unit LED2 and third unit LED3 need to be updated, the following may occur:

in case of prior art communication methods, or If I=0, then the payload (and DATA field) includes 9 words. The first 3 words of the payload are assigned to LED1 but contain the same information as the last update of LED1, while the following 6 words of the payload contain the update information for LED2 and for LED3.

in case of the present invention, if I=1, then an additional word is added to the DATA field, e.g., before the payload. The additional word includes information assigning bits in the payload to the required electronic units, in this case units LED2 and LED3. Hence, only 6 words are required in the payload. These words are distributed following the information in the additional word. For example, in accordance with the particular assignment included in the added bit string, 3 of the 6 words (e.g., the first 3 words) are used to update LED2, while the other 3 of the 6 words (e.g., the last 3 words) are used to update LED3. The assignment could be done by assigning a bit position to each LED, although other assignments can be codified in the driving unit (e.g., in the BPPU) and in the MCU. In the particular embodiment where each bit position has assigned a LED, the added bit string would for instance 0x0006 (in binary, 0b0110). Although an extra word ('Instr' field) is required, there is no need to include 3 words to address LED1, so overall the data load of the DATA field is reduced: the DATA field includes 7 words (1 word for the added 'Instr' field, plus 6 words to update LED2 and LED3), compared to 9 words required in the previous case where I=0 (3 words for each of the 3 LED clusters, even though only LED2 and LED3 need to be updated).

This shows that the protocol with a variable data length field depending on the F-bit and the I-bit is very effective regarding data traffic on the bus. The present invention is suitable for a high data throughput, since data can be provided directly to the required electronic unit or units specifically.

The present invention, applied in an M2S communication, allows adding extra space to write the address of slaves, so a larger number of units could be addressed in the same system while allowing adding information regarding instructions (or even address information, as shown below e.g., regarding burst pointer address), without sacrificing space for including the data length. It can also be used to assign data bits from the DATA field to specific electronic units of the addressed slave, where the added bit string contains the specific assignment of the electronic unit that needs to receive the information. This reduces data load compared to sending data bits of all the electronic units which do not need update, up to the one that actually requires the update.

The present invention is also advantageous in S2M communication frames.

The present invention can be used to specify which S2M frame is requested by the MCU. The request can be done in the bit string added to the DATA field. In the prior art, the MCU needs to send a communication frame including a DATA field in order to specify which S2M is requested in the following frame. This is not efficient, as it requests a higher bus traffic.

Embodiments of the present invention enable the request in one LED frame containing bits assigned to electronic units. Thus, instead of using a dedicated communication frame to request information from the slave, the same communication frame used to update electronic units could be used to request information. This solution advantageously reduces bus load, thus reducing emissions and potentially EMC problems. In particular, the method comprises enabling the added bit string (via the instruction bit I), and using a part of the bit string to indicate different actions and information. For example, a part of the bit string may specify the electronic unit, while a different part of the bit string may comprise an identifier for data to be transmitted by the addressed slave. This is exemplified as follows.

The MCU may set the bits accordingly in a first frame, requesting information to an addressed driving unit. For example, the function bit F and instruction bit I may both be set (value 1). The addressed driving unit answers accordingly in a second frame.

FIG. 6 shows three rows with different communication frames. If the ID field includes an R bit of 0, the slave receives data in an M2S frame; if on the other hand the R bit is 1, the slave transmits data in an S2M frame. The first row 6M1 shows the message to update the second RGB unit LED2 only. It also includes an information request. Both are included in the additional bit string.

In particular, the first row 6M1 includes LED data as payload as indicated by the value of the function bit F.

The instruction bit I is set, so an additional bit string is added to the DATA field, e.g., before the payload, forming the 'Instr' field. The information in this field can be decoded in software (the present invention not being limited thereto).

The added bit string can be divided in different substrings for indicating different actions and information. In some embodiments, the bit string is a word divided in a low byte and a high byte, as explained earlier. The added word in the first row 6M1 includes the message to update the second RGB unit LED2 in part of the added word, and an information request in a different part of the added word. This is indicated by the particular value of the function bit F. In embodiments of the present invention, as seen in this example, the function bit indicates whether data bits are assigned to electronic units or not. An instruction (in this example, a request of information from the driving unit) may be also present in the added bit string, irrespective of the function bit.

In particular embodiments, the low byte includes the position of the electronic unit and the high byte includes the instruction, the present invention not being limited to this particular order, or to this particular number of bits in the bit string.

For example, for a device which only supports two RGB units, it is possible to use only the lowest two bits to indicate the electronic unit which needs to be updated, while the other 14 bits in the word could be used for e.g., instruction.

The embodiments of the FIG. 6 shows that the low byte (in this case, 0x02) contains the LED position as explained above (in this case LED2). The high byte (in this case, 0x03) contains an identifier used to select which S2M data shall be loaded in the transmit buffer, to be transmitted by the addressed slave in a next frame. In this example the value of the high byte indicates that the MCU is e.g., requesting the measured LED forward-voltages. The LED forward voltages are measured with known methods, and, in a next frame, these measured LED forward voltages will be transmitted to the MCU.

In this particular embodiment, since the high byte includes 8 bits, it allows for instance $2^8=256$ different instructions to be provided. If the added bit string would include two words, this address space as well as the space for connected LEDs can be increased. The protocol is advantageously very flexible.

There are many different instructions available for request by the MCU, for example:
enter e.g., an application mode,
enter e.g., a calibration mode, e.g., to pre-set defined light outputs to all LEDs,
enter e.g., an (auto) addressing mode,
enter e.g., programming mode for e.g., the NV program memory,
send e.g., color information to LEDs
enable e.g., a driving mode for the LEDs (e.g., a linear driving via a current source or PWM driving),
request e.g., a diagnosis, if e.g., all LEDs carry a current,
request e.g., a slave address,
request e.g., a color information for the connected LEDs, e.g., the type of LED, e.g., if these are red, green, blue (RGB) LEDs,
request e.g., a temperature information,
write e.g., data to a given memory location,
read e.g., data from a given memory location,
enter e.g., to a stand by operation e.g., a sleep mode,
enter e.g., to write one or multiple specific registers, enter e.g., to read one or multiple specific registers, and many others are thinkable.

The second row 6M2 of FIG. 6 shows the S2M header (R bit is 1), wherein the MCU is requesting the slave to send the content of the slave transmit buffer. The I bit is set. The slave will respond with the content from its transmit-buffer. The slave will also include the at least one additional word, being the instruction. The additional word contains the instruction received previously (so for example the instruction included in the high byte received earlier, in accordance with some embodiments of the present invention, is repeated by the slave, which can be used to verify the previous instruction sent by the master), followed by the transmission of the information requested by the MCU.

The last row 6M3 of FIG. 6 shows the SM2 header (R bit is 1). The MCU makes the same request as in the second row 6M2. However, in this case there is no additional word, since the instruction bit I is null. The slave does not repeat the instruction received earlier, the slave just follows the instruction and transmits the information requested. The DATA field will be then reduced by 1 word, since the previous instructions will not be included in the DATA field.

Both options for S2M communication are possible. The option of the second row 6M2 gives more security, because the MCU can add diagnosis information on the frame. On the other hand, the option of the third row 6M3 is one word shorter, allowing more data through put. This improves flexibility of the communication, allowing the user to choose which option suits better for each situation and application.

There are additional uses for the instruction bit I. For example, the method may comprise directly reading or writing registers of the addressed driving unit on the added bit string enabled by the instruction bit. Registers as such can be memories (as e.g., NV memories, RAM, ROM, . . . ), ports, ADC registers, etc.

Reading a register may comprise applying the register address to be read in the DATA field. In some embodiments of the present invention, the method comprises applying a burst pointer address in the additional bit string (provided that the instruction bit I enables the additional bit string). A burst pointer address is a predetermined address which is the same for all connected driving units of the same kind in a network system. It is used by the driving units to set internal pointers in their register map. The burst pointer address depends on the systems, so for example different versions of the system electronics may have different burst pointer addresses. However, the MCU has the information required to use burst pointer address, if needed.

FIG. 7 shows, in the first row 7M1, the use of the burst pointer address. The PL length is set to 0, so the payload will include only one data unit (PL length+1, as explained earlier) which, in accordance with the value of the function bit F (F=0), should be interpreted as one word. Since the instruction bit I is set to a value such that there is no additional bit string added to the DATA field, the length of the DATA field is the length of one word. This one word is provided to the addressed driving unit, following the value of the R bit (zero). The word is the address 0x1234 which is known, and the addressed driving unit will interpret it as a burst pointer address. If a broadcasting address is used, all slaves will put their pointers to this burst pointer address and start further actions (e.g., read/write) from there. It is noted that the figure shows 'burst pointer address' but this is only a label in the figure, not instructions or information for the driving unit, since there is no bit string added.

For reading a particular register, the particular register address is sent in the DATA field to the known burst pointer address of the addressed driving unit.

The following S2M messages include an ID field sent by the MCU where the R bit is set to 1, so that the slave responds with the content of the registers, starting at a predetermined register address. Both rows 7M2 and 7M3 are equivalent as S2M frames, however the third row includes in the DATA field an extra word, as defined by the value of the instruction bit I. Under this definition, the 'Instr' field includes the start address of the data that the driving unit sends. Thus, the slave sends the current address in the added bit string. This register address is set within the previous M2S message payload. The MCU specifies the number of registers that are required to read. This can be done using the PL length field. For example, the number given in the PL length field is the number of the registers that are read, starting from the predetermined register address, increasing in a linear order until the PL length is reached.

In some embodiments, the address range usually starts at 0x0000 and finishes at a predetermined value, so values above said predetermined value are not interpreted as an address. The method may comprise interpreting the added bit string depending on its value, for example for a value above a predetermined number, the added bit string may be interpreted as instructions, and for a value equal or under that predetermined number, as addresses, which may include a burst pointer address. Analogously, the system implementing the method of the present invention may be adapted to specify which values can be considered instructions and which values can be considered register addressed. In some non-limiting embodiments, for example, a definition for a system could be that values below 0xE000 are interpreted as addresses, while values equal or above are instructions.

Writing or reading a register may comprise writing or reading one or multiple registers. E.g., the method of the present invention may comprise adding the first register to write in the DATA field. In some embodiments, the instruction bit I enables at least one further bit string, e.g., one or more words, in the DATA field which contains the first register address to write. The payload, which may start after the added bit string, contains the data to write to the registers. For a given frame, the payload is the PL length+1, and the data field contains the payload plus, eventually, one additional bit string (in this case a word) depending on the value of the instruction bit I. Since writing or reading is done in a linear order, the number of registers is defined by the PL length. Thus, the PL length indicates the number of registers to write or read, also in this case.

Starting this register operation is done in the instruction field. If the R bit is zero, the communication frame is M2S and a 'write' operation is done. If the PL length is set to e.g., 6 words, the slave will receive 6 words and write one word per register, so 6 consecutive registers will receive one word. If the R bit is 1, the frame is a S2M frame, and a 'read' operation is done.

FIG. 8 shows communication frames for writing registers. The rows 8M1 to 8M4 are M2S frames, in accordance with the value of the R bit (set as 0). The PL length field only has 3 bits, so the available values vary from 000 to 111 which equals to 7 in decimal. Because the payload is equal to the PL length+1, after 8 words in the payload, a new frame with a new start address must be initialized for the addressed slave. Thus, after the row 8M1 finishes, the next row starts. Since the instruction bit I is 1, the added bit string provides the 'start address' of the data that the slave should put to the registers, starting from that 'start address', in a linear order.

Thus, the present invention improves the communication by allowing a large bit string for the address of driving units, and if required, a bit string is added in the data field. The driving unit interprets the ID field including one instruction bit that indicates whether the bit string is added or not. The added bit string can be used to add information (confirmation by a driving unit of a previously received instruction, start register address in a communication for writing registers, etc.) and/or instructions such as instructions to update electronic units, confirmation by a driving unit of a previously received instruction, even a combination of an assignment of data bits in a portion of the further bit string and a further instruction or information in a different portion of the further bit string, as explained previously in FIG. 6.

The invention claimed is:

1. A method of operating a plurality of driving units for powering electronic units, the method comprising interchanging a frame including a bit sequence between a master control unit and at least one of a plurality of driving units, the sequence being divided in fields of consecutive bit strings, the method comprising:
   applying an ID field for addressing at least one driving unit, for interchanging data between the master control unit and the at least one addressed driving unit,
   applying a DATA field comprising a payload including information and/or instructions regarding the status of the electronic units of said addressed at least one driving unit,
wherein applying the ID field further comprises
   indicating the driving unit address using a first substring of bits comprising N bits, where $2^N$ is equal or higher than the number of driving units in the plurality of driving units, for applying the DATA field on the at least one addressed driving unit, and ignoring the DATA field if the driving unit is not addressed,
   using a receive/transmit command bit for assigning values, for allowing the master control unit to identify whether data should be received from or transmitted to the at least one addressed driving unit, and for allowing each addressed driving unit to decode which action is required by the master control unit when the frame is received by the at least one addressed driving unit, depending on the value assigned to the receive/transmit command bit,
   indicating the length of the payload using a second substring in the ID field,
   characterized in further using an instruction bit for assigning values, indicating the type of information in the DATA field,
   wherein applying the DATA field further comprises applying a sequence of bits consisting of the sequence of bits of the payload, if the instruction bit has a first value, and
   wherein applying the DATA field comprises applying a sequence of bits comprising the sequence of bits of the payload and at least one additional bit substring at a pre-defined position in the DATA field, the additional bit substring introducing information for carrying out an action by the driving unit if the instruction bit has a second value different from the first.

2. The method of claim 1, wherein applying the ID field further comprises applying a function bit for assigning values, and further comprises assigning bits of the DATA field to different electronic units for a first value of the function bit F and processing data bits in the DATA field as driving unit instructions for a second value of the function bit F.

3. The method of claim 1, wherein applying an ID field comprises using a string of 16 bits.

4. The method of claim 1, wherein indicating the driving unit address using a first substring of bits comprises using a first bit substring consisting of 8 bits.

5. The method of claim 1, wherein the second substring consists of 3 bits.

6. The method of claim 1, wherein powering electronic units comprises powering LED clusters including more than one LED.

7. The method of claim 1, wherein interchanging a frame comprises assigning the second value to the instruction bit such that at least one additional bit substring is added to the DATA field, and further comprises transmitting a DATA field from the at least one driving unit to the master control unit, wherein the additional bit string includes information of the instruction performed by the driving unit.

8. The method of claim 1, further comprising transmitting an instruction in at least one word added to the DATA field, divided in a predefined first byte containing the position of at least one electronic unit, and a predefined second byte, different from the first byte, containing an identifier used to select which data from the driving unit to the master control unit shall be loaded in a transmit buffer to be transmitted by the addressed driving unit in a next frame.

9. The method of claim 1, wherein using an instruction bit comprises assigning the second value to the instruction bit such that at least one additional bit substring is added to the DATA field, wherein the at least one additional bit substring includes a burst pointer address.

10. The method of claim 8, further comprising sending a request from the master control unit to the slave to send the data in the transmit buffer from the driving unit to the master control unit.

11. The method of claim 9, further comprising reading the information of registers using the burst pointer address for a first value of the receive/transmit command bit.

12. The method of claim 9, further comprising writing the information in the registers using the burst pointer address for a second value of the receive/transmit command bit.

13. The method of claim 10, wherein sending the request from the master control unit comprises setting the second value of the instruction bit for applying the additional bit string, to send the data in the transmit buffer from the driving unit to the master control unit and further sending, in the additional bit string, the identifier previously received by the driving unit.

14. A driving unit connectable to a plurality of electronic units and to a master control unit, the driving unit being configured to interchange a frame including a bit sequence between the master control unit and at least one of a plurality of driving units, the sequence being divided in fields of consecutive bit strings, comprising:
   applying an ID field for addressing at least one driving unit, for interchanging data between the master control unit and the at least one addressed driving unit,
   applying a DATA field comprising a payload including information and/or instructions regarding the status of the electronic units of said addressed at least one driving unit,
wherein applying the ID field further comprises
   indicating the driving unit address using a first substring of bits comprising N bits, where $2^N$ is equal or higher than the number of driving units in the plurality of driving units, for applying the DATA field on the at least one addressed driving unit, and ignoring the DATA field if the driving unit is not addressed, using a receive/transmit command bit for assigning values, for allowing the master control unit to identify whether data should be received from or transmitted to the at least one addressed driving unit, and for allowing each addressed driving unit to decode which action is required by the master control unit when the frame is received by the at least one addressed driving unit, depending on the value assigned to the receive/transmit command bit, indicating the length of the payload using a second substring in the ID field, characterized in further using an instruction bit for assigning values, indicating the type of information in the DATA field, wherein applying the DATA field further comprises applying a sequence of bits consisting of the sequence of bits of the payload, if the instruction bit has a first value, and wherein applying the DATA field comprises applying a sequence of bits comprising the sequence of bits of the payload and at least one additional bit substring at a predefined position in the DATA field, the additional bit substring introducing information for carrying out an action by the driving unit if the instruction bit has a second value different from the first.

15. A system comprising a plurality of driving units connectable to a plurality of electronic units and to a master control unit, further comprising the master control unit connected to the plurality of driving units, the master control unit and driving units being configured to interchange a frame including a bit sequence between the master control unit and at least one of a plurality of driving units, the sequence being divided in fields of consecutive bit strings, comprising:

applying an ID field for addressing at least one driving unit, for interchanging data between the master control unit and the at least one addressed driving unit, applying a DATA field comprising a payload including information and/or instructions regarding the status of the electronic units of said addressed at least one driving unit, wherein applying the ID field further comprises indicating the driving unit address using a first substring of bits comprising N bits, where $2^N$ is equal or higher than the number of driving units in the plurality of driving units, for applying the DATA field on the at least one addressed driving unit, and ignoring the DATA field if the driving unit is not addressed, using a receive/transmit command bit for assigning values, for allowing the master control unit to identify whether data should be received from or transmitted to the at least one addressed driving unit, and for allowing each addressed driving unit to decode which action is required by the master control unit when the frame is received by the at least one addressed driving unit, depending on the value assigned to the receive/transmit command bit, indicating the length of the payload using a second substring in the ID field, characterized in further using an instruction bit for assigning values, indicating the type of information in the DATA field, wherein applying the DATA field further comprises applying a sequence of bits consisting of the sequence of bits of the payload, if the instruction bit has a first value, and wherein applying the DATA field comprises applying a sequence of bits comprising the sequence of bits of the payload and at least one additional bit substring at a predefined position in the DATA field, the additional bit substring introducing information for carrying out an action by the driving unit if the instruction bit has a second value different from the first.

* * * * *